(12) United States Patent
Paumier et al.

(10) Patent No.: US 6,749,656 B2
(45) Date of Patent: Jun. 15, 2004

(54) HEATING, VENTILATING AND/OR AIR CONDITIONING DEVICE COMPRISING AT LEAST AN AIR DIFFUSING ELEMENT IN A MOTOR VEHICLE PASSENGER COMPARTMENT

(75) Inventors: Carine Paumier, Versailles (FR); Pascale Petitjean, Neauphle le Vieux (FR); Didier Loup, Maurepas (FR); Jean Casulli, Mantes la Jolie (FR); Emmanuel Reymond, Poissy (FR); Marc Saget, Mezy sur Seine (FR); Jean Philippe Thome, Conflans St Honorine (FR)

(73) Assignees: Valeo Climatisation, La Verriere (FR); Rieter Technologies A.G., Wintherthur (CH)

( * ) Notice: Subject to any disclaimer, the term of this patent is extended or adjusted under 35 U.S.C. 154(b) by 0 days.

(21) Appl. No.: 10/220,694

(22) PCT Filed: Mar. 5, 2001

(86) PCT No.: PCT/FR01/00637

§ 371 (c)(1),
(2), (4) Date: Feb. 10, 2003

(87) PCT Pub. No.: WO01/66371

PCT Pub. Date: Sep. 13, 2001

(65) Prior Publication Data

US 2003/0145567 A1 Aug. 7, 2003

(30) Foreign Application Priority Data

Mar. 6, 2000 (FR) ............................................. 00 02832

(51) Int. Cl.$^7$ ................................................... B60H 1/34
(52) U.S. Cl. ....................... 55/385.3; 55/385.1; 55/522; 55/523; 55/524; 55/527; 123/198 E; 264/44; 264/DIG. 48; 366/340
(58) Field of Search ............................. 55/385.1, 385.3, 55/523, 524, 522, 527; 123/198 E; 264/44, DIG. 48; 210/510.1, 490, 496, 506; 366/340

(56) References Cited

U.S. PATENT DOCUMENTS

| 4,373,001 A | | 2/1983 | Smith et al. |
|---|---|---|---|
| 5,620,366 A | | 4/1997 | Munzel et al. |
| 5,967,224 A | * | 10/1999 | Iwanaga et al. ............... 165/42 |
| 6,375,014 B1 | * | 4/2002 | Garcera et al. ............. 210/490 |
| 6,383,422 B1 | * | 5/2002 | Hoffschmidt ................. 264/44 |

FOREIGN PATENT DOCUMENTS

DE       29715576       12/1997

* cited by examiner

*Primary Examiner*—Minh-Chau T. Pham
(74) *Attorney, Agent, or Firm*—Clark & Brody

(57) ABSTRACT

The invention concerns a heating, ventilating and/or air conditioning device comprising at least an air distribution channel having a downstream end, and at least an air diffusing element arranged at said one downstream end. The invention is characterized in that the air diffusing element (1) comprises a support (11) provided with through orifices (17) and covered over at least one of its faces with a material (12, 16), having air resistance ranged between 10 N.s.m$^{-3}$ and 180 N.s.m$^{-3}$.

10 Claims, 2 Drawing Sheets

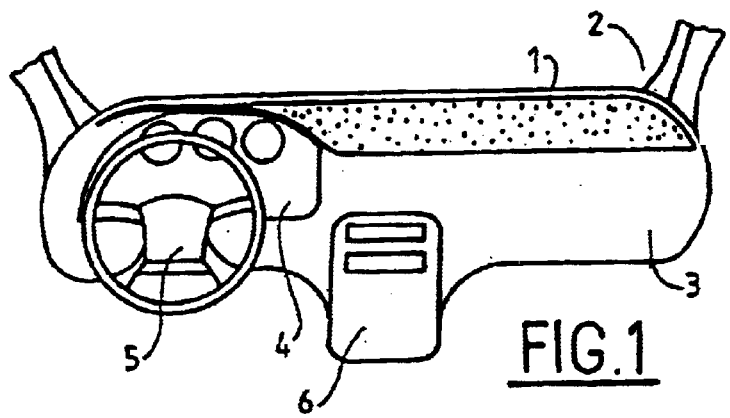
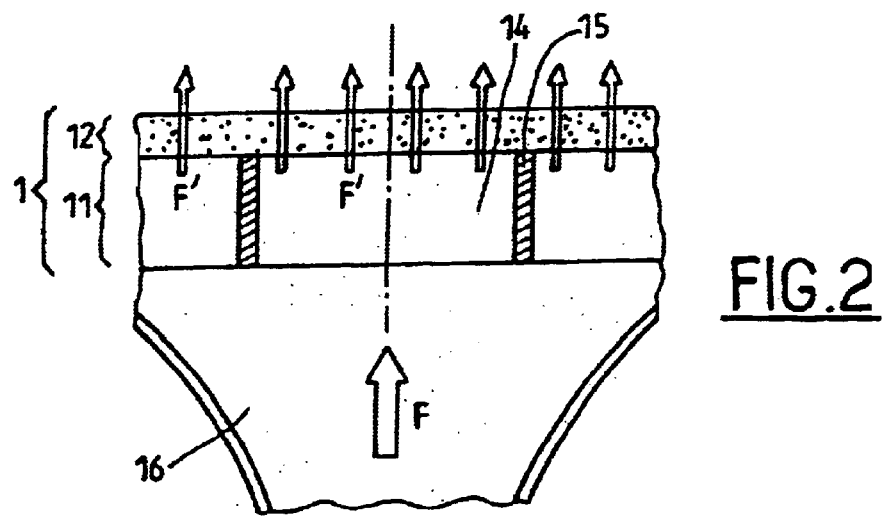
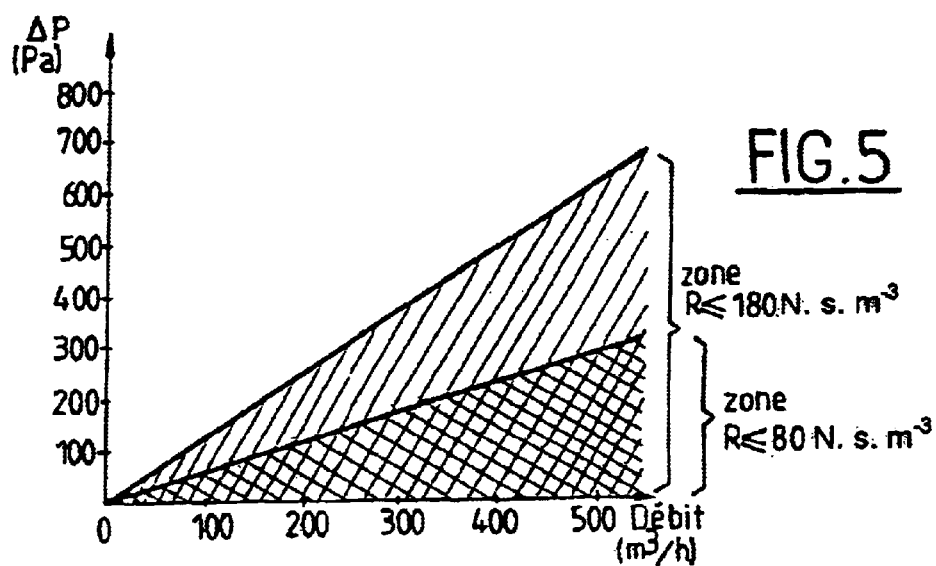

HEATING, VENTILATING AND/OR AIR CONDITIONING DEVICE COMPRISING AT LEAST AN AIR DIFFUSING ELEMENT IN A MOTOR VEHICLE PASSENGER COMPARTMENT

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION (1) Field of the Invention

The subject of the present invention is a heating, ventilating and/or air conditioning device comprising at least one air distribution channel having one downstream end, and at least one air diffusion element placed at one said downstream end, in order to diffuse the air in the vehicle passenger compartment.

(2) Description of Related Art

Usually, air is diffused in the vehicle passenger compartment via a plurality of nozzles. These systems have drawbacks: they cause currents of air and poor distribution of temperature in the passenger compartment, which adversely affects the comfort of the passengers.

To overcome this problem, a known solution consists in diffusing the air through a porous surface, which extends over the dashboard. These porous surfaces are generally obtained by providing a large number of small holes perforated through a surface impermeable to air, as mentioned in French Patent Application FR 2 074 471 and in British Patent GB 1 040 469.

In the known devices, the porous surfaces are either too porous, in which case the flow of air in the air diffusion nozzles associated with the diffusion is too great, or insufficiently porous, in which case the pressure drop is too high and the dynamic for controlling the temperature of the passenger compartment is too weak and its effect is not felt in a satisfactory manner by the passengers.

BRIEF SUMMARY OF THE INVENTION

The subject of the present invention is a heating, ventilating and/or air conditioning device which makes it possible to overcome this problem and to obtain regular diffusion of air which provides sufficient temperature control in the passenger compartment while preventing the aforementioned air current phenomena from being caused.

Within this aim, the invention relates to a heating, ventilating and/or air conditioning device comprising at least one air distribution channel having one downstream end, and at least one air diffusion element placed at one said downstream end, characterized in that at least one said air diffusion element, having, for example an area of between 0.02 m$^2$ and 0.5 m$^2$ and preferably between 0.04 m$^2$ and 0.2 m$^2$, comprises a support provided with through-orifices and covered over at least one of its faces with a material having an air resistance of between 10 N.s.m$^{-3}$ and 180 N.s.m$^{-3}$.

Advantageously, said air resistance is less than 80 N.s.m$^{-3}$.

The material may be a textile, especially a multilayered textile.

The textile and the support may advantageously be secured by thermal adhesion.

It is advantageous for the support to be rigid or semirigid.

According to a preferred embodiment, the support is thermoformed.

The support may, for example, be a honeycomb.

The invention also relates to a heating, ventilating and/or air conditioning device comprising at least one air distribution channel having one downstream end, and at least one air diffusion element placed at one said downstream end, characterized in that at least one said air diffusion element, having, for example, an area of between 0.02 m$^2$ and 0.5 m$^2$ and preferably between 0.04 m$^2$ and 0.2 m$^2$, has an air resistance of between 10 N.s.m$^{-3}$ and 180 N.s.m$^{-3}$.

Said air assistance is advantageously less than 80 N.s.m$^{-3}$.

The air diffusion element may in particular comprise a perforated plate, a grid, a cellular open-pore plastic or an alveolar material.

It is advantageous that the air diffusion element comprises at least one textile.

The air diffusion element may comprise a rigid or semi-rigid support for said textile.

The support may, for example, be a perforated plate.

It is advantageous that the support has an air resistance at least half and preferably at least one 10$^{th}$ that of said textile.

According to a preferred embodiment, the support has through-orifices.

The textile may be woven or non-woven, for example, a velvet.

The textile may be multilayered.

BRIEF DESCRIPTION OF THE SEVERAL VIEWS OF THE DRAWINGS

Other advantages and characteristics of the invention will become better apparent on reading the following description, given by way of nonlimiting example, in relation to the appended drawings, in which:

FIG. 1 shows a view of the dashboard of a vehicle equipped with a device according to the present invention;

FIG. 2 shows a sectional view of an exemplary embodiment of a composite panel according to the invention;

FIG. 5 shows a graph of pressure drop as a function of the flow rate of a device according to the invention.

DETAILED DESCRIPTION OF THE INVENTION

Figure 3:
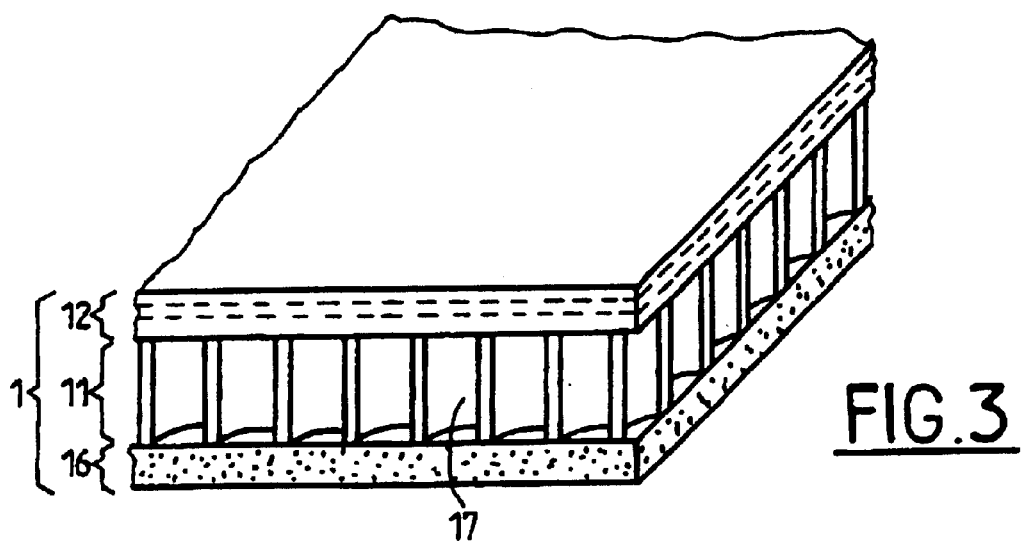
FIG. 3 shows a view in section and in perspective of an embodiment of a composite panel according to the invention.

The dashboard 3 shown in FIG. 1 comprises a fascia 3, an instrument panel 4, a steering wheel 5, a console 6 and, at the upper part of the dashboard 3, and adjoining the windshield 2, a surface air-diffusion element 1 which extends, for example, over the entire width of the vehicle, and which makes it possible to provide a distributed air diffusion, with a low surface flow rate, in order to provide diffusion of air without the air current being perceptible to the passengers and with a uniform distribution of the temperature in the vehicle passenger compartment.

The air diffusion is provided by a material, especially a textile, having an air resistance of between 10 N.s.m$^{-3}$ and 180 N.s.m$^{-3}$. In particular, the use of a woven or nonwoven textile is particularly advantageous in this sense since it provides a uniform and truly surface diffusion while providing a covering for the dashboard which is compatible with the aesthetic requirement of designers.

For small vehicles, whose passenger compartment is not spacious (for example, two-seater vehicles, urban vehicles), a higher pressure drop is permissible through the textile 12. The latter may have an air resistance which is high, but less than 180 N.s.m$^{-3}$, which provides a dynamic for controlling the temperature of the passenger compartment which satisfies passenger comfort.

For vehicles whose passenger compartment is larger, the dynamic for controlling the temperature of the passenger compartment must also enable the temperature of the rear space of the vehicle to be controlled within a satisfactory time period. In this case, an air resistance of less than 80 N.s.m$^{-3}$ will be chosen.

As shown in FIG. 2, the air diffusion element 1 may be a composite panel comprising at least one said material, especially a textile 12 and a support 11, for example a rigid or semirigid support 11. The support 11 may be a frame to which the permeable layer 12 is fastened. Alternatively, the support has two through-holes 14 comprising walls 15 which provide the mechanical properties of the assembly. This support 11 provides the rigidity and the shaping of the panel thus constructed. The support 11 may be a grid, a perforated plate, or an alveolar material, for example honeycombed, having through-cells. In this way, the air diffusion element 1 is integrated with the dashboard 3 both visually and mechanically. The cross section of the end of the pipe 16 has an area, for example, of between 0.02 m$^2$ and 0.5 m$^2$ and preferably between 0.04 m$^2$ and 0.2 m$^2$.

A main air flow F is diffused by a divergent air intake 16 and the through-cells 14 produce a first subdivision of this flow parallel to their axis and these subdivided flows F' then pass through the material 12, for example a textile, in order to produce the function sought.

The through-cell structure thus forms small channels improving the homogenization of the flow, and the pressure drop is mainly due to the material 12 (and/or 16).

As shown in FIG. 3, the composite panel 1 may comprise two textile layers 12 and 16 on either side of the through-cell structure 11 which has through-orifices or cells 17. The air resistance accumulated at these two layers 12 and 16 is between 10 N.s.m$^{-3}$ and 180 N.s.m$^{-3}$, and more particularly, less than 80 N.s.m$^{-3}$. This structure is advantageous, since it provides better rigidity of the assembly because of the fact that films or textiles 12 and 16 are present on either side of the structure 11. This composite also has good acoustic absorption characteristics, which means that the passengers perceive the noise of the heating, ventilating and/or air conditioning device less.

Figure 4A:
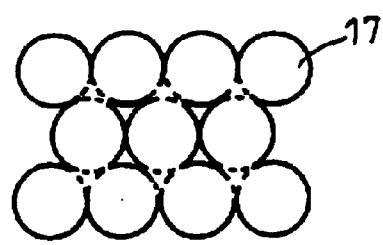
FIGS. 4a to 4d show embodiments of supports with through-cells according to some embodiments of the invention.
Figure 4B:
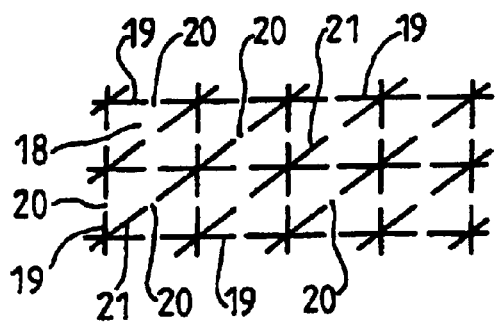
Figure 4C:
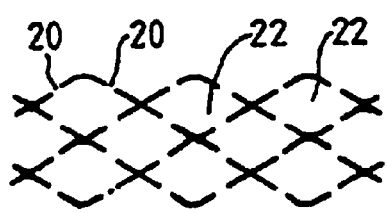
Figure 4D:
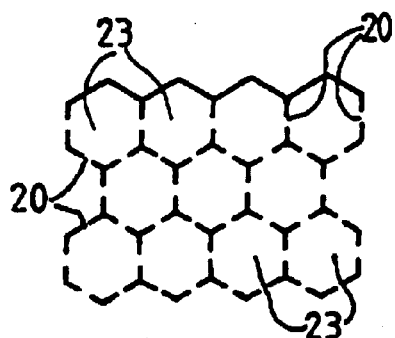

FIGS. 4a to 4d show various embodiments of the support 11. In FIG. 4a, the cells are circular. In FIG. 4b, they have a rectangle-triangle shape, the sides 19 and the hypotenuse 21 of which are provided with orifices 20, which put adjacent cells 18 in communication. In FIG. 4c, the cells 22 are lozenge-shaped and may be provided with orifices 20 for communication between adjacent cells. In FIG. 4d, the through-cells or orifices 23 are hexagonal, formed from a honeycomb structure. The walls of the cells 23 may have communication orifices 20.

The composite panel may be manufactured simply, since the adhesive bonding is produced by thermal adhesion and the composite is formed by thermoforming.

One or more composite panels may be integrated in the dashboard and/or the roof and/or the parcel shelf of a vehicle and/or the doors.

Finally, FIG. 5 shows, as a function of the pressure difference ΔP expressed in Pascal and of the flow rate in m$^3$/h, the operating regions for values of R such that R≦180 N.s.m$^{-3}$ and R≦80 N.s.m8$^{-3}$.

What is claimed is:

1. A heating, ventilating and/or air conditioning device comprising at least one air distribution channel having a downstream end, and at least one air diffusion element placed at said downstream end, wherein said at least one air diffusion element (1) comprises a support (11) provided with through-orifices (17) and having at least one face covered with a material (12, 16) having an air resistance of between 10 N.s.m$^{-3}$ and 180 N.s.m$^{-3}$.

2. The device as claimed in claim 1, wherein said air resistance is less than 80 N.s.m$^{-3}$.

3. The device as claimed in claim 1, wherein said at least one air diffusion element has an area of between 0.02 m$^2$ and 0.5 m$^2$ and preferably between 0.04 m$^2$ and 0.2 m$^2$.

4. The device as claimed in claim 1, wherein said material is a textile.

5. The device as claimed in claim 4, wherein said textile is multilayered.

6. The device as claimed in claim 5, wherein said textile (12, 16) and said support (11) are secured together by thermal adhesion.

7. The device as claimed in claim 1, wherein said support (11) is rigid or semirigid.

8. The device as claimed in claim 1, wherein said support (ii) is thermoformed.

9. The device as claimed in claim 1, wherein said support (11) is in the form of a honeycomb (23).

10. The device as claimed in claim 9, wherein said honeycomb has through-cells (23) which communicate with each other via orifices (20) made in at least one of said honeycomb.

* * * * *